United States Patent
Grenabo

(10) Patent No.: US 7,940,861 B2
(45) Date of Patent: May 10, 2011

(54) QAM PHASE ERROR DETECTOR

(75) Inventor: Håkan Grenabo, Stenkullen (SE)

(73) Assignee: Advantech Advanced Microwave Technologies, Inc., Saint-Laurent, Quebec (CA)

( * ) Notice: Subject to any disclaimer, the term of this patent is extended or adjusted under 35 U.S.C. 154(b) by 748 days.

(21) Appl. No.: 12/000,027

(22) Filed: Dec. 7, 2007

(65) Prior Publication Data

US 2009/0147839 A1 Jun. 11, 2009

(51) Int. Cl.
*H04L 27/00* (2006.01)
*H03K 9/00* (2006.01)

(52) U.S. Cl. ............... 375/316; 332/106; 455/130

(58) Field of Classification Search .......... 375/316
See application file for complete search history.

(56) References Cited

U.S. PATENT DOCUMENTS

| | | | |
|---|---|---|---|
| 5,602,601 A * | 2/1997 | Kim et al. | 348/607 |
| 5,684,842 A | 11/1997 | Daffara | |
| 5,796,786 A * | 8/1998 | Lee | 375/326 |
| 6,154,510 A * | 11/2000 | Cochran et al. | 375/371 |
| 6,417,834 B1 | 7/2002 | Balz | |
| 6,560,294 B1 | 5/2003 | Gatherer | |
| 6,603,821 B1 * | 8/2003 | Doi | 375/326 |
| 6,826,238 B2 | 11/2004 | Ahn | |
| 6,920,174 B1 | 7/2005 | Wolf et al. | |
| 6,954,420 B1 | 10/2005 | Wolf et al. | |
| 7,016,426 B1 | 3/2006 | Balz et al. | |
| 7,145,957 B1 | 12/2006 | Balz et al. | |
| 7,366,256 B2 | 4/2008 | Eudes et al. | |
| 2003/0123595 A1 * | 7/2003 | Linsky et al. | 375/376 |
| 2003/0236073 A1 * | 12/2003 | Wetzker | 455/67.11 |
| 2004/0105396 A1 | 6/2004 | Eudes et al. | |
| 2004/0137869 A1 * | 7/2004 | Kim | 455/324 |
| 2005/0175127 A1 | 8/2005 | Balz et al. | |
| 2006/0018406 A1 * | 1/2006 | Chen et al. | 375/316 |
| 2008/0051042 A1 * | 2/2008 | Komaili et al. | 455/114.3 |
| 2008/0181344 A1 * | 7/2008 | Jiang et al. | 375/354 |
| 2009/0088120 A1 * | 4/2009 | Ling et al. | 455/314 |

FOREIGN PATENT DOCUMENTS

| | | |
|---|---|---|
| DE | 10 2004 016 937 | 11/2004 |
| EP | 0 692 896 | 1/1996 |
| EP | 1 313 279 | 5/2003 |
| EP | 1 418 724 | 5/2004 |

* cited by examiner

*Primary Examiner* — Chieh M Fan
*Assistant Examiner* — Santiago Garcia
(74) *Attorney, Agent, or Firm* — Harness, Dickey & Pierce, P.L.C.

(57) ABSTRACT

The present invention relates to a method for reducing cycle slips in a carrier recovery loop for a phase detector, the method comprising the steps of receiving an input signal consisting of samples, each received sample having an in-phase (I) and quadrature-phase (Q) component, providing the input signal to a phase error estimator adapted to determine a phase error estimate, providing the phase error estimate to a loop filter, and forming an output signal from the carrier recovery loop by subtracting an output from the loop filter from the input signal, wherein the phase error estimate is determined based on a combination of the amplitude and phase of the samples and a probability measure for a specifically transmitted symbol, thereby improving phase tracking performance of the carrier recovery loop.

Advantages with the present invention includes reduction of cycle slips without using a high performance, and expensive, hardware solution, at the same time as it is possible to suppress the effects of decision errors which enables higher gain, thereby giving an improvement in Bit Error Rate (BER) in low SNR conditions.

The present invention also relates to a corresponding phase detector.

8 Claims, 3 Drawing Sheets

× Constellation points
· Phase error estimation points
B Border width

○ Constellation points
× Received data

QAM PHASE ERROR DETECTOR

FIELD OF THE INVENTION

The present invention relates to a method for reducing cycle slips in a carrier recovery loop for a phase detector. The present invention also relates to a corresponding phase detector.

DESCRIPTION OF THE RELATED ART

A challenge for a wireless receiver is to operate efficiently even when the transmission is subject to noise. The effect of thermal and phase noise must as far as possible be suppressed to achieve a high transfer rate. In traditional Quadrature Amplitude Modulation (QAM), a phase detector is used for providing a decision directed phase estimation of a received signal, and the phase of the received signal is in a feedback manner compared with a phase of an estimated symbol, thereby generating a phase error estimate. The estimate is then used for improving the error rate of the transmission.

When working in a low signal-to-noise ratio (SNR) environment, due to decision errors simple decision directed phase estimation may give increasingly worse result, eventually resulting in a cycle slip, i.e. the constellation diagram is rotated by the periodicity angle of the modulation (90 degrees for e.g. 16-QAM and 64-QAM). A cycle slip is generally fatal for error correction codes as the soft information may be good, but the hard decision is wrong. The effect of a cycle slip is generally that the entire Forward Error Correction (FEC) block is lost. Clearly, to make use of a sophisticated FEC scheme, the sum of the thermal noise and the carrier phase noise must be low enough so that cycle slips will contribute less to the total bit error rate than the additive thermal noise at the detector.

This problem might be overcome by lowering the transmission rate; however, as there is an increasing demand for higher transmission rates, this is not an option. Instead, complex hardware is suggested, such as for example using a high performance VCO (Voltage Controlled Oscillator). However, solutions involving high performance hardware are generally expensive, thereby increasing the cost of the receiver.

An alternative solution to using a high performance VCO is disclosed in U.S. Pat. No. 5,796,786, providing a phase error detection method that is applied to a QAM receiver. In the disclosed method, a decided I-channel level value is chosen approximating the phase-corrected I-channel data among predetermined reference I-channel level values. A phase error value for the received data is obtained by subtracting the decided I-channel level value from the phase-corrected I-channel data, and multiplying the sign of the difference by the difference itself, and applying a weight value from a predetermined weighting function to the phase error value weighted phase error value, which is fed back to be used for phase correction of received data. However, the disclosed method still does not provide an adequate reduction of cycle slips, and will thus not provide a solution to the demand for higher transmission rates and for use under low SNR conditions.

OBJECT OF THE INVENTION

There is therefore a need for an improved method for reducing cycle slips in a carrier recovery loop for a phase detector, which method at least alleviates the problems according to the prior art while providing further improvements in terms of accuracy and the possibility to allow for higher transmission rates.

SUMMARY OF THE INVENTION

According to an aspect of the invention, the above object is met by a method for reducing cycle slips in a carrier recovery loop for a phase detector, the method comprising the steps of receiving an input signal consisting of samples, each received sample having an in-phase (I) and quadrature-phase (Q) component, providing the input signal to a phase error estimator adapted to determine a phase error estimate, providing the phase error estimate to a loop filter, and forming an output signal from the carrier recovery loop by subtracting an output from the loop filter from the input signal, wherein the phase error estimate is determined based on a combination of the amplitude and phase of the samples and a probability measure for a specifically transmitted symbol, thereby improving phase tracking performance of the carrier recovery loop.

Advantages with the present invention includes reduction of cycle slips without using a complex, and expensive, hardware solution, at the same time as it is possible to suppress the effects of decision errors. This enables an improvement in BER (Bit Error Rate) and allows for a higher gain in the carrier recovery loop in a low SNR environment. According to the invention, the BER is improved by including a weight function taking into account a combination of the amplitude and phase of the received samples and a probability measure for a specifically transmitted symbol. For example, a sample data point positioned close to the border between two decision points in a constellation diagram (i.e. adjacent to the border of the "decision area" surrounding the closest decision point in a modulation scheme) will have a lower weight than a sample point close to the decision point.

In a preferred embodiment of the present invention, the phase detector is a QAM phase detector. In the case of QAM, the amplitude of two waves, 90 degrees out-of-phase with each other (in quadrature) are changed (modulated or keyed) to represent the data signal, thus the received sample having an in-phase (I) and quadrature-phase (Q) component. Thus, the skilled addressee understands the difference between a received sample and a transmitted symbol, where for QAM modulation the data to be transmitted is mapped to actual symbols. Accordingly, each symbol in the QAM symbol map (also sometimes denoted constellation plot) is distinguished by a unique phase and amplitude. In addition, the M-ary of the modulation scheme defines how many symbols are in the specific symbol map.

For example, 4-QAM has a symbol map with 4 symbols and 256-QAM has a symbol map of 256 symbols. Accordingly, the disclosed method is useful in relation to for example one of a 4-QAM, a 8-QAM, a 16-QAM, a 32-QAM, a 64-QAM, a 128-QAM, a 256-QAM or any other higher order QAM phase detector. The disclosed method is also useful with for example 8PSK or any similar modulation type. With for example 4-QAM modulation, each symbol represents two bits of information. When sending an actual symbol stream, every two samples are grouped to generate the corresponding symbol. For example, the data bit sequence (0, 1, 0, 0, 1, 0) would be grouped into three symbols: (01, 00, 10). Thus, three symbols are required to represent the entire data bit sequence. This is in contrast to for example 64-QAM which contains 64 unique symbols. As a result of the high symbol number, each symbol in 64 QAM represents 6 bits of information. Thus, the data bit sequence (0, 1, 0, 0, 1, 0) can be represented by one symbol (010010).

As a further enhancement, it is possible to optimize the determination of the phase error estimate based on a predetermined SNR for the input signal. Additionally, the determination of the phase error estimate can be further based on the reliability of the sample. That is, the weight calculation depends on what SNR to optimize for, where at high SNR the transition regions can be smaller than with low SNR. With only a minor degradation in performance, the function values can be pre-calculated for a fixed SNR operating point. Also, the amplitude of the sample is weighed in; the rationale behind this is that the effect of a decision error—the error in the phase error measure—is inversely proportional to the amplitude of the signal vector.

Preferably, the determination of the phase error estimate, $E_{ij}^0$ (i.e. the phase error estimate for a specific sample) is calculated according to $$E_{ij}^0 = (P_{ij} \cdot \Phi_{ij}) \cdot A_{ij}$$

where $P_{ij}$ represents the vector of probabilities of transmission of a specific sample in relation to each constellation point for the phase detector, $\Phi_{ij}$ represents the vector of hard phase error estimates, and $A_{ij}$ represents the amplitude for the received sample. A hard estimation relates whether a sample should be decoded as a "1" or as a "0", where in comparison a soft decision comprises the "hard" decision and an indication of the level of confidence to be placed in the estimation. A further discussion relation to the determination of the phase error estimate is provided below in the detailed description of the invention.

According to a further aspect of the invention, there is provided a phase detector, including a carrier recovery loop adapted for reducing cycle slips, the phase detector comprising means for receiving an input signal consisting of samples, each received sample having an in-phase (I) and quadrature-phase (Q) component, means for providing the input signal to a phase error estimator, means for determining a phase error estimate, a loop filter, means for providing the phase error estimate to the loop filter, and means for forming an output signal from the carrier recovery loop by subtracting an output from the loop filter from the input signal, wherein the phase error estimate is determined based on a combination of the amplitude and phase of the samples and a probability measure for a specifically transmitted symbol, thereby improving phase tracking performance of the carrier recovery loop.

This aspect of the invention provides similar advantages as according to the above discussed method for reducing cycle slips in a carrier recovery loop for a phase detector, including for example the possibility to suppress the effects of decision errors, which enables an improvement in BER by allowing for a higher gain in the carrier recovery loop. The phase detector according to the invention is preferably, but not exclusively, used as a component in digital cable television and cable modem applications, as a component in a digital telecommunication system, or as a component in a satellite television or satellite communication system.

According to a still further aspect of the present invention there is provided a computer program product comprising a computer readable medium having stored thereon computer program means for causing a control unit to control phase detecting means to reduce cycle slips in a carrier recovery loop, wherein the computer program product comprises code for receiving an input signal consisting of samples, each received sample having an in-phase (I) and quadrature-phase (Q) component, code for providing the input signal to a phase error estimator adapted to determine a phase error estimate, code for providing the phase error estimate to a loop filter, and code for forming an output signal from the carrier recovery loop by subtracting an output from the loop filter from the input signal, wherein the phase error estimate is determined based on a combination of the amplitude and phase of the received samples and a probability measure for a specifically transmitted symbol. In a high performance and high speed environment, the phase detector is preferably implemented in an ASIC or an FPGA.

BRIEF DESCRIPTION OF THE DRAWINGS

These and other aspects of the present invention will now be described in more detail, with reference to the appended drawings showing currently preferred embodiments of the invention, in which.

DETAILED DESCRIPTION OF CURRENTLY PREFERRED EMBODIMENTS

Figure 1:
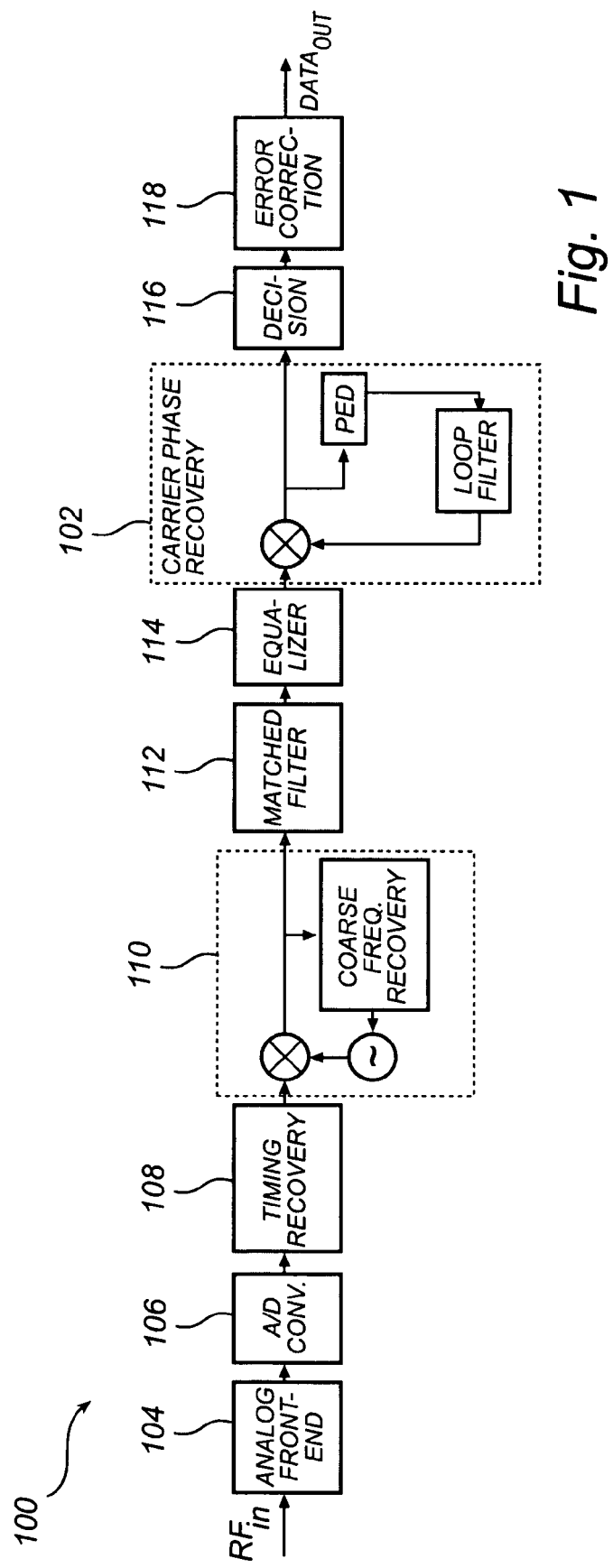
FIG. 1 is a block diagram of a receiver comprising a decision directed carrier phase recovery function.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Referring now to the drawings and to FIG. 1 in particular, there is depicted a block diagram of a receiver 100 in a digital communication system comprising a decision directed carrier phase recovery function 102. The block diagram in FIG. 1 and related description provides a coarse illustration of a receiver where the phase detector according to the present invention can be implemented. The skilled addressee understands that the below description of the receiver is generalized and provided at a high level for not obscuring the description of the present invention.

Initially, an analog front-end 104 preconditions a received analog input signal $RF_{in}$ for an A/D converter 106 by frequency shifting and/or level adjustment. In turn, the A/D converter 106 converts the analog input signal $RF_{in}$ to digital samples. A timing recovery 108 synchronizes the digital samples in time to the symbol frequency and outputs a fixed number of samples per symbol interval. Thereafter, a coarse frequency recovery function 110 corrects for large frequency deviation in the received signal. It outputs digital samples close enough to zero frequency to enable the carrier phase recovery to capture the signal. A matched filter 112 then maximizes the signal-to-noise ratio in the signal, after which an equalizer 114 corrects for impairments in the analog channel.

After this, the carrier phase recovery function 102 removes any residual frequency offset and suppresses phase noise in the signal. Subsequently, a decision function 116 produces a symbol decision for each received symbol, and possibly also quality information for the decision, and finally, an error correction function 118 corrects for decision errors using redundant information in the received data, and provides a digital data output Data$_{out}$.

The carrier phase recovery function 102, and possibly additional blocks of the block diagram in FIG. 1, is preferably implemented in a control unit, where the control unit may include a microprocessor, a microcontroller, a programmable digital signal processor or another programmable device. The control unit may also, or instead, include an application specific integrated circuit (ASIC), a programmable gate array, a programmable array logic, a programmable logic device, or a digital signal processor. Where the control unit includes a programmable device such as the microprocessor or microcontroller mentioned above, the processor may further include computer executable code that controls operation of the programmable device.

Figure 2:
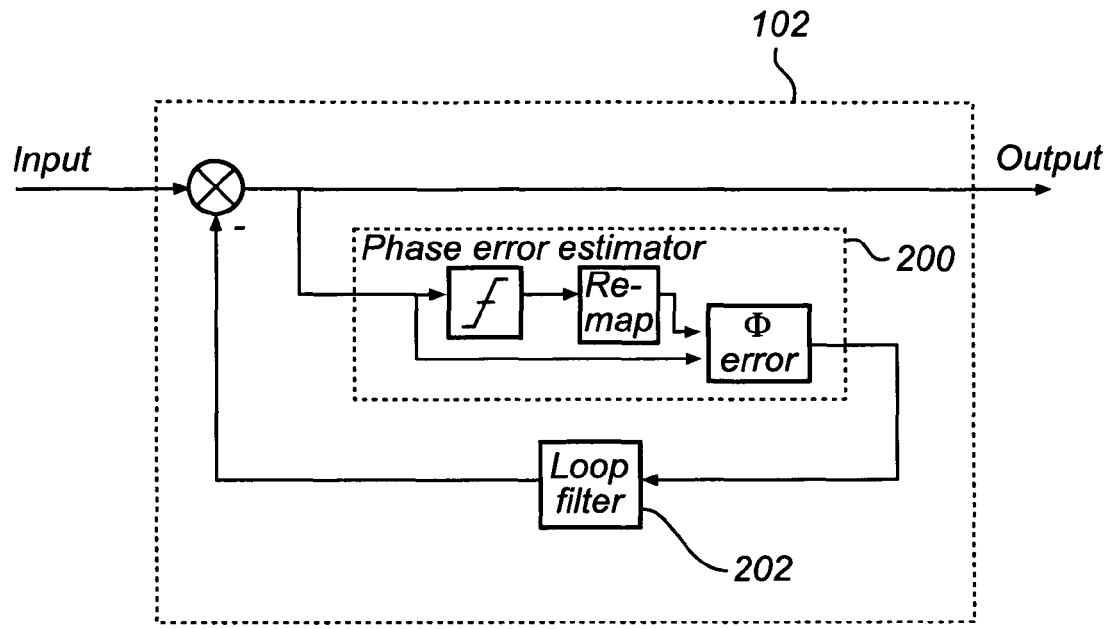
FIG. 2 is a block diagram illustrating decision directed carrier recovery loop comprising a prior art phase error estimator.

In FIG. 2 it is provided a detailed illustration of the carrier phase recovery function 102 in FIG. 1, comprising a prior art phase error estimator 200. In this prior art implementation, a hard decision is taken, and the phase of the received signal is compared to the phase of the estimated symbol which is taken as a phase error estimate. This estimate is then fed into the loop filter 202. The implementation of the loop filter 202 is generally application specific. The output phase of the loop filter is then subtracted from the input signal to close the loop. That is, the phase error estimate is used for improving the BER of the transmission.

Figure 3:
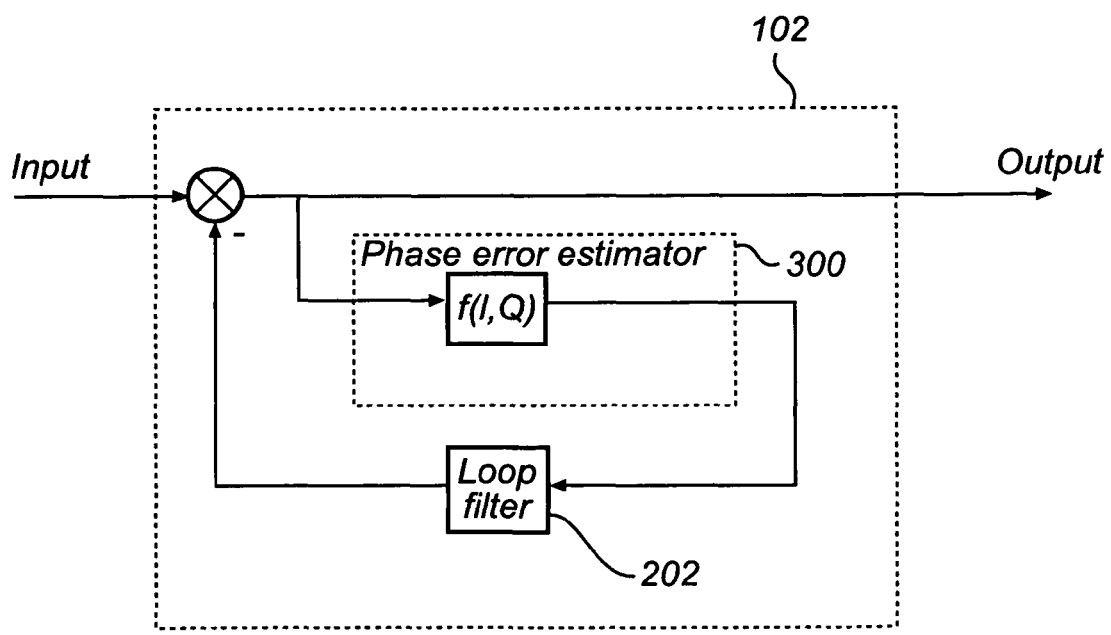
FIG. 3 is a block diagram illustrating a carrier recovery loop comprising a phase error estimator adapted in accordance with the present invention.
Figure 4:
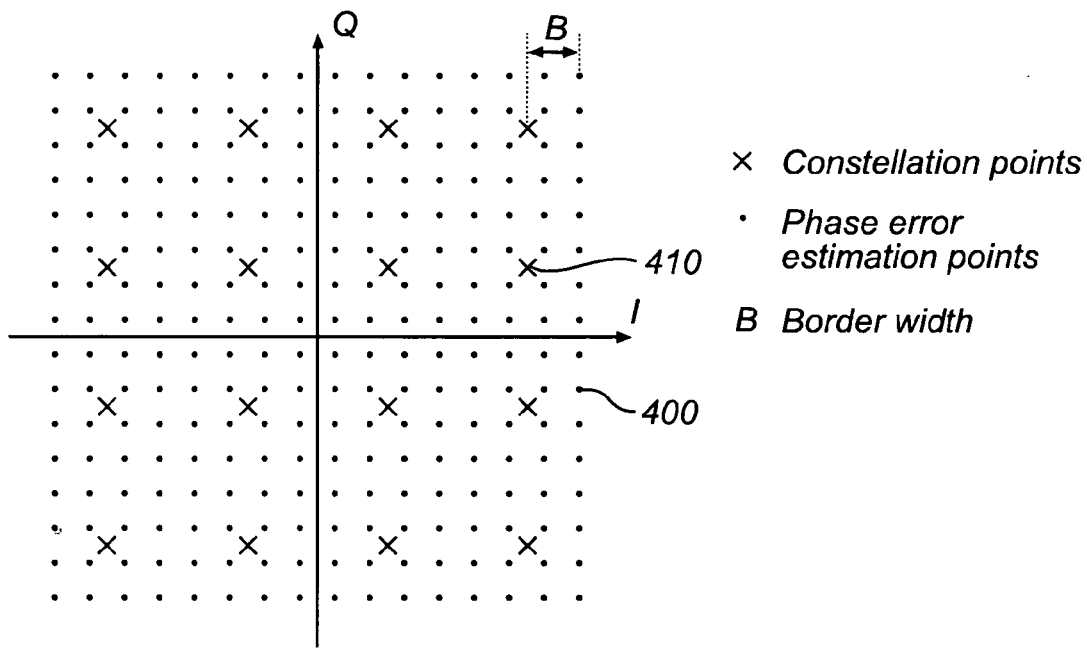
FIG. 4 shows a diagram illustrating the phase error estimation points for 16-QAM.

Turning now to FIG. 3, which also provides a detailed illustration of the carrier phase recovery function 102 in FIG. 1, but where the prior art phase error estimator of FIG. 2 has been exchanged for an improved phase error detector 300 according to the present invention. In the phase error detector 300, the phase error estimate is conversely to the prior art phase error detector 200 calculated by a function over the signal space, e.g. the sampled I and Q values comprised in the received input signal. The definition space of the function covers the area of the constellation diagram (see FIG. 4) plus a surrounding "border" and gives the phase error estimate. The density of points 400 (i.e. denoted· in the diagram of FIG. 4), and the resolution of the phase error estimate are design parameters coming from a trade-off between performance and realization constraints. The constellation diagram in FIG. 4 provides an illustration (16-QAM, 16×16 phase error estimation points 400) of the phase error estimation points 400 in relation to the constellation points 410 (i.e. denoted X in the diagram of FIG. 4).

Figure 5:
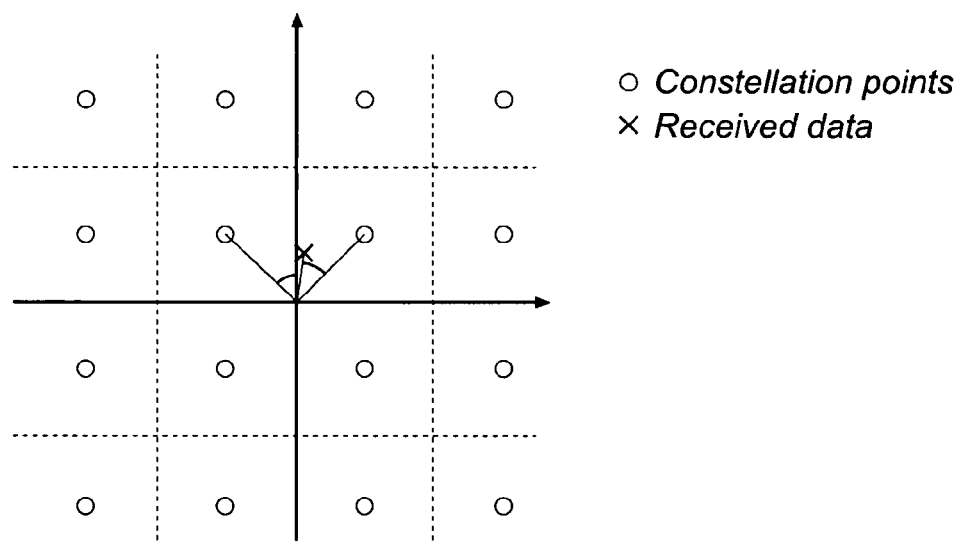
FIG. 5 shows a constellation diagram for 16-QAM including a received sample.

Accordingly, when considering a sample falling close to the boundary between two decision regions as shown in FIG. 5, the prior art phase error estimator 200 would give a phase error measure of +45° or −45° depending on which hard decision is made. In case of a wrong decision, the carrier recovery loop will get a 90° hit in the wrong direction. If the loop gain is high, the carrier phase will be shifted to make the probability of another symbol error higher, eventually causing a cycle slip. If the reliability of the decision is weighed in, the received sample indicated in FIG. 5 will get a weight close to zero, and will consequently have little impact on the carrier phase. The weight calculation depends on what SNR to optimize for, and at high SNR the transition regions can be smaller than with low SNR. With only a minor degradation in performance, the function values can be pre-calculated for a fixed SNR operating point. As a further enhancement, the amplitude of the sample is weighed in, where the rationale behind this is that the effect of a decision error, i.e. the error in the phase error measure is inversely proportional to the amplitude of the signal vector.

The below description provides a theoretical definition of the determination of the phase error estimate in accordance with the present invention. The theoretical definition is given as a non limiting example for allowing the skilled addressee to understand and carry out the method according to the present invention. Thus:

1. Let K be the number of points in the signal constellation, i.e. the constellation points 410 in FIG. 4.

2. Let k∈[1,K] be the index in the enumeration of points in the signal constellation (order is irrelevant).

3. Let $x_k$ (i.e. the points 410 in the signal constellation in FIG. 4) be the set of complex-valued points in the signal constellation.

4. Let N be the number of elements per dimension in the phase error estimator table.

5. Let i and j be the indices in the two-dimensional phase error estimator table i,j∈[1,N]

6. Let B be a design parameter describing the size of the "border" surrounding the constellation points where the phase error estimator table is defined.

7. Let $I_{Min}$, $I_{Max}$, $Q_{Min}$, $Q_{Max}$ be the minimum and maximum values of the real and imaginary parts of the constellation points respectively.

8. Let $y_{ij}$ be the points 400 in FIG. 4 in the complex signal plane where the elements of the phase error estimator table are calculated. These points are then given by $$\mathrm{Re}(y_{ij}) = I_{Min} - B + \frac{i-1}{N-1} \cdot (I_{Max} - I_{Min} + 2B)$$

and $$\mathrm{Im}(y_{ij}) = Q_{Min} - B + \frac{j-1}{N-1} \cdot (Q_{Max} - Q_{Min} + 2B)$$

9. Let Δ be a matrix with elements $\Delta_{ij}$ where each element is in its turn a vector with elements, i.e. the distance from each definition point 400 in the phase error estimator table to each point 410 in the constellation set $(\Delta_{ij})_k = |y_{ij} - x_k|$ 10. Let SNR, which is a design parameter, be the optimization value for the signal-to-noise ratio (e.g. select suitable SNR value).

11. Let σ be the noise standard deviation, e.g. white Gaussian noise, according to $$\sigma = \sqrt{\frac{1}{K} \cdot \sum_{k=1}^{K} x_k^2} \cdot 10^{-\frac{SNR}{20}}$$

12. Let P be a matrix with elements $P_{ij}$, where each element is in its turn a vector with elements, and corresponds to the probability of each constellation point being sent given the received signal sample $$(P_{ij})_k = \frac{1}{\sqrt{2\pi} \cdot \sigma} \cdot \exp\left(-\frac{[(\Delta_{ij})_k]^2}{2\sigma^2}\right)$$

13. Let φ be a matrix with elements $\phi_{ij}$, where each element is in its turn a vector with elements, and corresponds to the phase error for each constellation point given the received signal sample $(\Phi_{ij})_k = \arg(y_{ij} x_k^*)$ 14. Let A be a matrix with elements $A_{ij}$, i.e. the amplitude in every point, where $$A_{ij} = |y_{ij}|$$

15. Let $E_{ij}^0$ be a matrix with elements, where $E_{ij}^0$ represents the phase error estimate for a specific sample $$E_{ij}^0 = (P_{ij} \bullet \Phi_{ij}) \cdot A_{ij}$$

where $P_{ij}$ and $\Phi_{ij}$ are vectors that are inner multiplied.

16. Let Y be a matrix with hard decision coordinates $Y_{ij}$ for each definition point $y_{ij}$ of the phase error estimator table $$Y_{ij} = x_{(m_{ij})}$$

where $m_{ij}$ is selected to minimize $(\Delta_{ij})_m$.

17. Let ψ be a matrix with elements, where ψ represents the hard decision phase error between the points $y_{ij}$ and the corresponding hard decision points $Y_{ij}$ $$\Psi_{ij} = \arg(y_{ij} Y_{ij}^*)$$

18. Let C be a scale factor $$C = \frac{\sum_{i=1}^{N} \sum_{j=1}^{N} \Psi_{ij}^2}{\sum_{i=1}^{N} \sum_{j=1}^{N} (E_{ij}^0)^2}$$

19. An finally, let $E_{ij}$ be the elements in the phase error estimator table $$E_{ij} = C \cdot E_{ij}^0$$

That is, the scale factor C serves to normalize the average phase error to the same value as the hard decision phase error making the loop gain figures comparable.

Thus, in conclusion, it is according to the present invention possible to provide a novel method for reduction of cycle slips in a phase detector without using a high performance, and expensive, hardware solution, at the same time as it is possible to suppress the effects of decision errors which enables higher gain, thereby giving an improvement in Bit Error Rate (BER) in low SNR conditions.

Furthermore, the skilled addressee realizes that the present invention by no means is limited to the preferred embodiments described above. On the contrary, the skilled addressee understands that many modifications and variations are possible within the scope of the appended claims.

The invention claimed is:

1. A method of reducing cycle slips in a carrier recovery loop for a phase detector, the method comprising:
   receiving an input signal including a plurality of samples, each received sample having an in-phase (I) and quadrature-phase (Q) component;
   providing the received input signal to a phase error estimator configured to determine a phase error estimate;
   providing the determined phase error estimate to a loop filter, and
   forming an output signal from the carrier recovery loop by subtracting an output of the loop filter from the received input signal, the method further including:
   determining the phase error estimate based on a combination of an amplitude and a phase of the received samples and a probability measure for a specifically transmitted symbol, the phase error estimate improving phase tracking performance of the carrier recovery loop,
   determining the phase error estimate based on a reliability of the sample, and
   determining the phase error estimate ($E_{ij}^0$) according to:

$$E_{ij}^0 = (P_{ij} \bullet \Phi_{ij}) \cdot A_{ij}$$

wherein $P_{ij}$ represents the vector of probabilities of transmission of a specific sample in relation to each constellation point for the phase detector, $\Phi_{ij}$ represents the vector of hard phase error estimates, and $A_{ij}$ represents the amplitude for the received sample.

2. The method according to claim 1, wherein the phase detector is a QAM phase detector.

3. The method according to claim 1, wherein the determination of the phase error estimate is optimized based on a desired signal-to-noise ratio for the input signal.

4. A phase detector, including a carrier recovery loop configured to reduce cycle slips, the phase detector comprising:
   means for receiving an input signal including a plurality of samples, each received sample having an in-phase (I) and quadrature-phase (Q) component;
   means for providing the received input signal to a phase error estimator;
   means for determining a phase error estimate;
   a loop filter;
   means for providing the determined phase error estimate to the loop filter, and
   means for forming an output signal from the carrier recovery loop by subtracting an output off the loop filter from the input signal, wherein
   the phase error estimate is determined based on a combination of an amplitude and a phase of the received samples and a probability measure for a specifically transmitted symbol, the phase error estimate improving phase tracking performance of the carrier recovery loop,
   the means for determining the phase error estimate is further configured to determine the phase error estimate based on a reliability of the sample, and
   the means for determining the phase error estimate ($E_{ij}^0$) is further configured to calculate the phase error estimate in accordance with:

$$E_{ij}^0 = (P_{ij} \bullet \Phi_{ij}) \cdot A_{ij}$$

wherein $P_1$ represents the vector of probabilities of transmission of a specific sample in relation to each constellation point for the phase detector, $\Phi_{ij}$ represents the vector of hard phase error estimates, and $A_{ij}$ represents the amplitude for the received sample.

5. The phase detector according to claim 4, wherein the phase detector is a QAM phase detector.

6. The phase detector according to claim 4, wherein the means for determining the phase error estimate is optimized based on a desired signal-to-noise ratio for the input signal.

7. The phase detector according to claim 4, wherein the phase detector is used as a component in at least one of digital cable television system, cable modem application, a digital telecommunication system, a satellite television system and satellite communication system.

8. A computer program product comprising a non-transitory computer readable medium having stored thereon computer program means for causing a control unit to control phase detecting means for reducing cycle slips in a carrier recovery loop, wherein the computer program product comprises:

code for receiving an input signal including a plurality of samples, each received sample having an in-phase (I) and quadrature-phase (Q) component;

code for providing the received input signal to a phase error estimator configured to determine a phase error estimate;

code for providing the determined phase error estimate to a loop filter; and code for forming an output signal from the carrier recovery loop by subtracting an output off the loop filter from the received input signal, wherein the phase error estimate is determined based on a combination of an amplitude and a phase of the received samples and a probability measure for a specifically transmitted symbol, the phase error estimate is further determined based on a reliability of the sample, and the phase error estimate ($E_{ij}^0$) is determined according to:

$$E_{ij}^0 = (P_{ij} \bullet \Phi_{ij}) \cdot A_{ij}$$

wherein $P_{ij}$ represents the vector of probabilities of transmission of a specific sample in relation to each constellation point for the phase detector, $\Phi_{ij}$ represents the vector of hard phase error estimates, and $A_{ij}$ represents the amplitude for the received sample.

\* \* \* \* \*